United States Patent [19]

Intrater et al.

[11] 4,358,506

[45] Nov. 9, 1982

[54] METAL AND CARBON COMPOSITES THEREOF

[76] Inventors: Josef Intrater, 125 Demarest Ave., Englewood Cliffs, N.J. 07632; Gene Bertoldo, 306 W. 51 St., New York, N.Y. 10019

[21] Appl. No.: 200,514

[22] Filed: Oct. 24, 1980

Related U.S. Application Data

[63] Continuation-in-part of Ser. No. 157,310, Jun. 9, 1980, abandoned.

[51] Int. Cl.$^3$ .............................................. B32B 15/04
[52] U.S. Cl. .................................... 428/408; 428/430; 428/647; 428/634; 428/432; 427/113
[58] Field of Search ....................... 427/114, 113, 399; 428/408, 432, 647, 634

[56] References Cited

U.S. PATENT DOCUMENTS

| | | |
|---|---|---|
| 1,098,794 | 6/1914 | Fleming . |
| 2,636,856 | 4/1953 | Suggs et al. . |
| 2,866,724 | 12/1958 | Alexander . |
| 2,929,741 | 3/1960 | Steinberg . |
| 3,393,084 | 7/1968 | Hartwig . |
| 3,417,460 | 12/1968 | Galmiche . |
| 3,484,210 | 12/1969 | Pinter ................................. 427/114 |
| 3,673,038 | 6/1972 | Canonico et al. . |
| 3,713,790 | 1/1973 | Takamori et al. ................... 427/113 |
| 3,860,443 | 1/1975 | Lachman et al. . |
| 4,104,417 | 8/1978 | Sara .................................... 427/113 |

FOREIGN PATENT DOCUMENTS 1171855 12/1969 United Kingdom .

OTHER PUBLICATIONS

Naidich et al., Study of the Wetting of Diamond and Graphite by Liquid Metals, Institute of Cermets and Special Alloys, Academy of Sciences, Ukr.SSR, translated from *Poroshkovaya Metallargiya*, No. 1 (13), pp. 49–53, Jan.–Feb. 1963.

Naidich et al., "Investigation of the Wetting of Diamond and Graphite Bimolten Metals and Alloys," Institute of Material Problems, Academy of Science, Ukr.SSR, translated from *Poroshkovaya Metallurgiya*, No. 3 (21), pp. 23–28, May–Jun. 1968.

*Chemical Abstracts*, vol. 85, 1976, p. 181398J.

*Primary Examiner*—Ralph S. Kendall
*Attorney, Agent, or Firm*—Fred A. Keire

[57] ABSTRACT

As an article for manufacture, a tin, lead, indium, alloys of each with a carbide or carbonyl former in an admixture for forming said tin, lead and indium, wettable graphite composites which will not dewet upon heating; methods for preparing the composites of various shapes, layers, coatings, and sandwiches, of alloys, preforms and metal-graphite etc, structures are also disclosed.

15 Claims, No Drawings

METAL AND CARBON COMPOSITES THEREOF

This application is a continuation-in-part of U.S. application Ser. No. 157,310, filed June 9, 1980 and now abandoned.

This invention pertains to graphite composites; more specifically, this invention pertains to graphite composites of tin and graphite tin coating combinations having tin as one element in admixture with a carbide or carbonyl former and graphite as another, forming a composite of the two, or graphite with tin layers or coatings thereon on a surface of said graphite as a substrate. Specifically, this invention pertains to a graphite which is united with tin in a conjointly formed composition, the chemical nature of which has not been elucidated, but which, when separately formed, would not form a tin wettable graphite composite. Further joining of tin with compatible alloying materials of tin, e.g., copper, allows the formation of composites such as sandwich composites of various combinations having graphite, tin, and a metal in various sandwich arrangements. Still further, instead of tin, alloys of tin are within the scope of this invention such as alloys of tin and lead. Moreover, lead and/or indium, instead of tin are also practicable as base metals for joining graphite.

Additionally, preforms of tin, lead, indium metals, alloys of tin, lead and indium and a carbide or carbonyl former such as chromium have been obtained, which, when cast and shaped, can then be used in shapes such as discrete elements placed on graphite and silicon and, upon heat fusing, joined to said substrates to provide a composite for soldering or joining or fusing the composite to other substrates, e.g., graphite and/or silicon. As part of the present invention metalurgically "active" metals, which form atomically bound composites, have been discovered which, upon deposition on graphite, will have, such as for tin-lead-chromium zero or negative angles of wetting of said graphite or silicon substrate.

DISCUSSION OF THE BACKGROUND OF THE INVENTION

Carbon which, in general, and for the purposes of present disclosure, includes graphitic materials, and can range from the highly graphitic types of carbon to low temperature (1000° C. to 1400° C.) baked carbonaceous articles, possess properties which make carbon an excellent material for high temperature applications as a substrate material. Moreover, amongst the desirable properties, carbon possesses good thermal shock resistance, a high sublimation temperature point, and an increase in strength with increasing temperature (up to 2200° C.). Carbon, however, tends to oxidize in an oxidizing atmosphere.

In prior practice, a number of carbon composites have been formed and graphite has been coated with a number of combinations of metals such as chromium, titanium, hafnium, zirconium, vanadium, niobium, tantalum, tungsten and molybdenum. However, it has been found that when graphite has been coated with these carbide or carbonyl forming metals the subsequent deposition of tin results in a dewetting of tin upon the heating of the graphite substrate.

Consequently, the traditional coating elements such as disclosed in U.S. Pat. Nos. 3,393,084, 4,104,417, 3,860,443, 2,866,724, and 2,636,856 and even those disclosed found in U.S. Pat. No. 1,098,794 have failed to provide for a composition which would be a non-tin dewetting graphite composite.

BRIEF DESCRIPTION OF THE PRESENT INVENTION

It has now been found that the dewetting of graphite is avoided when it is coated with tin, a tin alloy, lead, lead alloys, and/or indium. When these metals or alloys are admixed with a carbide or carbonyl former and the coating is effected in an inert, or hydrogen atmosphere but preferably in a carbon monoxide atmosphere with graphite having an intermediate layer of the above type, unexpectedly and surprisingly dewetting in general can be avoided as a result of a synergistically related interaction of tin, a tin alloy, lead, a lead alloy, and/or indium and an element causing a conjoint combination of tin, a tin alloy, lead, a lead alloy, and/or indium with a graphite substrate. This allows a composite to be formed which will not dewet upon reheating of the same when tin, a tin alloy, lead, a lead alloy, indium or an indium alloy is further deposited thereon, (as well as thereafter and subsequent to the formation of the novel layer adheringly attached to graphite).

Thus, it has been found that when graphite is coated and a composite formed with tin, a tin alloy, lead, a lead alloy and/or indium, in combination with the carbide or carbonyl forming elements of the above recited group of compounds (but only upon a conjoint deposition) and then this composite joined such as with tin or a tin alloy coating or layer, lead or lead alloy coating or layer, carbon or graphite will form upon heating at an appropriate temperature, e.g., up to 1000° C. in a hydrogen atmosphere, or a hydrogen containing inert atmosphere, but preferably carbon monoxide atmosphere a non-dewettable carbon or graphite composite. Subsequent brazing of e.g., tin with other metals, such as copper, provides a number of possible composites or sandwiches of graphite structures.

Of the carbide or carbonyl forming elements, chromium, titanium, hafnium, zirconium, vanadium, niobium, tantalum, tungsten, molybdenum, when admixed in combination with tin in a colloidal dispersion (the carbide or carbonyl former, the metal being up to 10% to 15% metal to tin in the mixture but may be as low as 1% but typically 5% such as for chromium), and subsequently heated at or above 1000° C. in a hydrogen or carbon monoxide atmosphere, the carbide forming or carbonyl forming metal and tin will "react" with a graphite and will not dewet tin upon subsequent deposition of a tin coating thereon and heating of the substrate and deposit. Further heating the composite at a lower temperature, e.g., 600° C. to 900° C. with a copper overlay, forms a bronze composite on graphite which withstands higher temperatures, e.g., 700° C. to 800° C. Substantially the entire surface of graphite may be coated and oxidation of graphite thus prevented.

Although the exact mechanism or reasons for this phenomenon are not known, the surprising synergistic interaction is believed to be the following. When graphite and tin compete for atomic attraction for the carbide or carbonyl forming elements such as chromium, a film of intimately distributed tin and chromium regions are evenly dispersed on graphite. Whether the continuous film is a composite or a bound intermetallic composition of chromium, tin and graphite, it is not known. However, subsequent heating of this film or a further tin coating on this film does not cause tin dewetting on the graphite. A tin coating, therefore, when subsequently deposited on the conjointly deposited composition is bound in some form to it and apparently graphite and thus provides a strongly adhering and satisfactorily functioning graphite composite. Thus, when the graphite composite is first formed with such a film as described above and subsequently additional layers of tin are coated thereon, tin may be deposited at any thickness without dewetting thereof. Surprisingly, it has also been found that a very highly adherent joint or interface can be formed, not only between tin and carbon as described above, but also between lead and indium and alloys thereof, and the above metal mixture, e.g., lead and chromium mixture with graphite (at about the same proportions as given for tin and the metal), and thereby provide desirable composites which are inert to oxidizing atmosphere.

Other metals besides chromium which have been usefully joined in the above combination of tin-metal-graphite are vanadium and titanium. The group of carbonyl or carbide formers which are useful are chromium, molybdenum, vanadium, tungsten, iron, cobalt or nickel. Because of toxicity nickel or iron are dangerous and inadvisable for use although these could function for the alleged purpose. Typically the high temperature atmosphere at which the interface is formed is a carbon monoxide, a hydrogen or a hydrogen-nitrogen atmosphere (95% to 25% hydrogen, balance nitrogen). The latter atmosphere has been used for lead and/or indium with chromium for the graphite combination at 950° C.

Any metal which has high solubility in the interface composite can thereafter by alloyed with the interface deposit. Those alloying metals capable of increasing (or decreasing) temperature limits are desirable, depending on the purpose, e.g., for lower or higher temperature solder for higher temperature reinforcement such as copper (for bronze formation), etc.

GENERAL EXAMPLE

A. Direct Film or Layer Formation

A method of codeposition of tin, lead or indium alloys or alloyable mixtures thereof, was achieved by the use of colloidal suspension of a powder, tin, lead indium or alloys of each, and an element which is a carbide former such as of the group recited above. As a dispersant, for the colloidal suspension of these components, alcohol, water, or any fast drying liquid has been employed. Although it is not known if residual water content, the oxygen thereof, or the oxide film, if any, contribute to the formation of the film layer, it has been found that employment of the colloidal suspension with the variation of tin, lead or indium and carbide former in the ratio, such as from 95% to 5%, further 85% to 15%, but more broadly from 60% to 40% by weight to 40% to 60% by weight, for the carbide or carbonyl former with tin, lead, indium, or alloy composition of each will form a carbide interlayer element or film or coating which has the necessary affinity to the carbon surface for non-dewettable tin, lead, indium or various alloys thereof, including subsequent coating thereon of tin, lead, indium or alloys of each.

As a general practice, the carbon shape is immersed in this colloidal suspension and then air dried. Subseqeunt annealing in a carbon monoxide or a hydrogen atmosphere at the temperature from 600° C. and above 1000° C. (but depending on the carbide or carbonyl forming element chosen, may be as high as 1500° C.) produces the film which has been found so suitable for allowing subsequent additional tin, lead or indium coatings on the carbon substrate.

Typically chromium-tin mixtures of various proportions were annealed at 800° C., 900° C. and 1000° C. in carbon monoxide or hydrogen-nitrogen atmosphere (from 95% to 25% by volume hydrogen, balance nitrogen may be used).

When changing the ratios of, for example, tin and chromium powders and varying the amount of the liquid, various thicknesses of the initial film may be obtained which then can be overcoated with tin. A coating is generally of a thickness sufficient to cover the surface and generally is from about a few microns up to a sufficient thickness to provide the desired properties-$\frac{1}{2}$ mill under most circumstances will be sufficient. A carbon surface prepared as above was able to receive additional amounts of tin, lead or indium or alloyable deposits thereon in one or more steps.

B. Preform Fabrication and Composite or Sandwich Production

It was also found that when tin-lead alloy, e.g., of 60% tin—40% lead was used and to this composition chromium powder was added in a percent weight range from 15% to 1% but more typically from 10% to 3%, preferably 7 to 5%, and the composition were heated in a carbon monoxide atmosphere in a crucible of quartz or alumina (a carbon crucible may be used but the composition adheres strongly), an "alloy" is obtained which is malleable, can be rolled or shaped and it does not exude chromium. Heating is at a temperature of 500° C. but gradually the temperature is brought up to 900° C. to 950° C. and held for about 25 minutes in that atmosphere. The time at temperature may be longer or shorter. The "alloy" is held in a protected atmosphere and cooled until it is solidified. Typically chromium does not form an alloy with tin and lead and it is believed that it is justifiable to call the obtained composite an "alloy" as it can be rolled or shaped. The melting point of a 60-40 tin lead plus 5% chromium alloy is slightly higher than tin.

After rolling of the material, shapes of various configuration were punched out and placed on graphite, carbon or polished silicon slice and heated to a temperature of 950° C. in a protected atmosphere of carbon dioxide, carbon monoxide, nitrogen, hydrogen or mixtures of these (but preferably carbon monoxide). The shape thus placed on the substrate then thoroughly wets the surface (zero or negative angle of contact). The surface is solderable where the shape has been deposited. The deposited preform, when worked up can be used for joining graphite or silicon in sandwich form, as above. The preform can be joined with copper by merely placing it in contact with Cu in an inert atmosphere. Copper "soaks" up tin and raises the melting point of the preform. Of course, copper when so joined to graphite can also be readily soldered. Variation of time and/or temperature has a definite effect on the migration, i.e., penetration of copper into tin (or tin alloy), both into the graphite or into copper with an increase in the force needed for breaking the copper-tin-graphite bond. Generally breaking failure occurs in the graphite substrate.

C. Powder Preform Fabrication

If the powders of the tin, tin alloy, lead, lead alloy, indium, indium alloy with the above carbide or carbonyl former are admixed and pressed to form "green"

compacts (or preforms) and the carbon, i.e., graphite or silicon substrate, held in a carbon monoxide atmosphere such as up to 1000° C. or lower, e.g., 800° C., then an equivalent or better result is obtained from that given for methods A. or B. above.

Following the above procedure, the following composite film formers were employed for coating on graphite (which was available from Dixon Crucible, Bay City, New Jersey): vanadium-tin, titanium-tin, chromium-tin, chromium-lead, chromium-indium colloidal suspensions.

These coated products were useful, such as brushes (electrodes) for electrical motors, flat crucibles for growing silicon single crystals from molten silicon, other composite substrates for bonding metals to graphite to reduce structural brittleness of graphite structures, etc.

When a graphite substrate is treated according to the above procedure with the preform "alloy" or green compact and is then subsequently coated with a tin metal and heated, the tin metal will not dewet and ball up on the surface of the graphite.

When the above general example was followed, except that the refractory carbide or carbonyl former was first deposited and then a colloidal layer of tin deposited thereon and the same annealing procedure in a hydrogen atmosphere followed, the intermediate composite would not provide a non-dewetting substrate for tin upon a subsequent deposition of a tin layer thereon. In fact, the tin layer, when so deposited would dewet at an elevated temperature such as 232° C., its melting point. If the same example were followed and tin was deposited in a thin colloidal layer on top of graphite without the carbide or carbonyl former being present and the carbide or carbonyl former thereafter deposited thereon and the annealing procedure followed after each step or after the two depositions, the tin coating, if subsequently deposited on this, thus treated, substrate, would again dewet.

As it is evident from the above, the unexplainable synergistic interaction takes place only on the conjoint colloidal distribution and annealing at high temperatures of a mixture of the refractory carbide or carbonyl former and tin, lead or indium colloidal suspension. While a colloidal suspension has been used in the above examples, colloidal suspensions are merely one illustration of a dispersion. Uniform distribution of the coating(s) may also be achieved such as by painting with a vehicle in which suitably the above components are dispersed. Moreover, mixtures of the above carbide formers may also be employed in the coating. Further, other dispersion depositions, such as sputtering or vaporizing, may be used for forming the conjoint distribution of tin and carbide former appropriately selected to achieve the desired end result.

As discussed above, various alloys of tin, e.g., tin-lead, and of the other coating formers, i.e., lead and indium may also be used. These alloys must be such that when using the recited carbide or carbonyl formers incompatible, i.e., non-alloying mixtures do not form. A ready test for incompatibility is dewetting of the deposited coating. Another is the flaking or peeling of the coating which signifies the lack of chemical bond formation between the carbon substrate and the coating. It is also necessary to work with a dispersion of the carbide former and the deposited component and the alloys, within compatibility regions for the alloy components. These are very complex and therefore are best established by the above two tests, e.g., dewetting and peeling or flaking. These tests are best carried out by repeated heating and cooling cycles at progressively higher temperatures. According to the above tests, the composites as disclosed herein behaved satisfactorily. When graphite structures are joined with preforms of the above described "alloys" or the resistance measured between the preform deposit of graphite and alloy, no increase was observed with ordinary type of resistance detectors, i.e., ohmmeter which measures in milliohms.

Similarly, when graphite structures are joined with preform "alloys" exceptionally strong structural bonds are formed. When preforms are joined to silicon a very good collecting capacity for a silicon cell may be obtained which is not subject to oxidative deterioration. Hence, the life of a silicon solar cell can be be increased with less expensive fabrication techniques. When forming the so called preform "alloys", it was found that when the alloy was not formed in a carbon monoxide atmosphere, chromium would exude. Without being bound by any theory, but merely for explanation, it is believed that in carbon monoxide system, chromium, tin, lead or indium, or tin, lead or indium alloys, (as well as the other carbide or carbonyl formers of the above group), synergistically interact to cause one or more of the components, e.g., chromium to form a very active species probably in-situ and in the presence of carbon, so that the compound or complex when cooled behaves as if it were an "alloy". These compositions are sufficiently "alloyed" so as not to exude or separate out the carbide forming materials, yet these are sufficiently "active" in a reaction sense so as to adhere atomically, apparently, to carbon and silicon form the (even when in the green compact form when formed from powders and in the carbon monoxide atmosphere) tightly adherant coatings, layers and structures providing heretofore non-observed advantages.

As a result, dense pyrolytic graphite, graphite, carbon structures and silicon can now be usefully formed in various structures having various novel properties heretofore unknown.

What is claimed is:

1. A composite comprised of at least the following component parts of:
    (a) tin, lead, indium, a tin alloy, a lead alloy or an indium alloy in an amount from 60% to 99%, in combination with and, as a balance thereof, a metal which is a carbide or carbonyl former; and
    (b) a carbon or a silicon structure,
wherein a bond between said components (a) and (b) is highly adherent and substantially void free, non-dewettable upon heat cycling, component (a) forms with a zero or negative angle of contact on component (b), an electrical resistance increase is substantially zero after the bond formation between components (a) and (b), and component (a) is capable of covering an entire surface of (b).

2. The composite as defined in claim 1, wherein the carbide or carbonyl former is chromium, titanium, hafnium, zirconium, cobalt, iron, nickel, vanadium, niobium, tantalum, tungsten, molybdenum or mixtures thereof.

3. The composite as defined in claim 1, wherein component (b) is graphite.

4. The composite as defined in claim 1, wherein component (a) includes, as a carbide former, chromium.

5. The composite as defined in claim 1, wherein component part (a) is of tin.

6. The composite as defined in claim 5 wherein component (a) is tin with chromium, component (b) is graphite, component (c) is copper, and a composite comprises of components in an order as follows: (b), (a), (c), (a), and (b).

7. The composite as defined in claim 1 wherein the carbide former is vanadium.

8. The composite as defined in claim 1 wherein said (a) component is lead.

9. The composite as defined in claim 1 wherein said (a) component is indium.

10. The composite as defined in claim 1 wherein the carbide or carbonyl former is chromium, titanium, zirconium, vanadium, tungsten or molybdenum.

11. A sandwich composite comprised of at least component parts of:
(a) tin, lead, indium, a tin alloy, a lead alloy or an indium alloy, in an amount from 60% to 99%, in combination with and, as a balance thereof, a metal which is a carbide or carbonyl former;
(b) a carbon or a silicon structure, and
(c) as an overlay on (a) at least one layer of:
 (i) a carbon structure, a silicon structure or
 (ii) a metal alloyable with said component (a),
wherein a bond between said components (a), (b) and (c) is highly adherent and substantially void free, non-dewettable upon heat cycling, component (a) is capable of covering an entire surface of (b), component (a) forms with a zero or negative angle of contact on component (a) or with component (c) and an electrical resistance increase is substantially zero after the bond formation between components (a), (b) and (c).

12. The composite as defined in claim 11 wherein component (c) is copper, component (b) is graphite and between components (b) and (c) is tin-chromium as component (a).

13. The composite as defined in claim 11 wherein component (c) is graphite.

14. The composite as defined in claim 11 wherein component (c) is silica.

15. The composite as defined in claim 11 wherein component (b) is graphite and component (c) is a carbon.

* * * * *